United States Patent [19]
Schmidt

[11] 3,740,179
[45] June 19, 1973

[54] MULTI-PART INJECTION MOULDING DIE MEANS

[76] Inventor: Wilhelm Schmidt, Schlossstrasse 58, Nuremberg, Germany

[22] Filed: Dec. 15, 1970

[21] Appl. No.: 98,256

[30] Foreign Application Priority Data
Dec. 22, 1969 Germany.................. P 19 64 109.9

[52] U.S. Cl............................... 425/192, 425/247
[51] Int. Cl................................................ B29f 1/08
[58] Field of Search................. 18/30 RH, 30 RM, 18/30 RP, 30 RV, 30 NH, 30 HM, 30 HB, DIG. 13; 425/144, 192, 243; 249/78, 79, 81

[56] References Cited
UNITED STATES PATENTS

| | | | |
|---|---|---|---|
| 3,055,055 | 9/1962 | Cook et al......................... | 18/30 RH |
| 3,520,026 | 7/1970 | Stidham ........................... | 18/30 RH |
| 3,499,189 | 3/1970 | Derras.............................. | 18/30 RH |
| 3,189,948 | 6/1965 | Whitney............................ | 425/144 |
| 2,202,140 | 5/1940 | Burroughs......................... | 425/145 |
| 2,436,999 | 3/1948 | MacMillin et al. ............ | 425/244 X |
| 2,227,263 | 12/1940 | Knowles.......................... | 425/250 X |
| 2,878,515 | 3/1959 | Strauss.............................. | 425/243 |
| 3,289,257 | 12/1966 | Richards............................ | 249/79 |
| 3,640,662 | 2/1972 | Schwartz............................ | 425/144 |

Primary Examiner—J. Spencer Overholser
Assistant Examiner—David S. Safran
Attorney—Mason, Fenwick & Lawrence

[57] ABSTRACT

Injection moulding apparatus having injection means and one or more runners for the distribution of moulding material in plastic form to one or more mould cavities. A temperature controlling device for maintaining the plastic flow condition of the moulding material is located in the runner and comprises a hollow member substantially coextensive therewith. Such member is detachably securable to an interior side wall, preferably in a recess, of the runner and includes an occludable opening accessible exteriorly of the apparatus for the ready introduction of heating or cooling media such as fluids or electric heating elements as desired.

4 Claims, 6 Drawing Figures

INVENTOR
WILHELM SCHMIDT
BY
Mason, Fenwick, & Lawrence
ATTORNEYS

MULTI-PART INJECTION MOULDING DIE MEANS

The present invention relates to multipart injection moulding apparatus for the production of plastic mouldings, the said mould having one or more distributor runners extending from the injection means to the casting ducts and mould nozzles. Injection moulding apparatus of this kind is used mainly in processing thermoplastics, and generally includes heating elements in the proximity of the runners for maintaining the flowability of the material being processed. In some types of injection moulds similar in principle, the plastic material is fed, with no gate, within an insulated runner which also contains internal heater elements. In this case the insulated runner or runners themselves are located in the center of relatively large recesses in the relevant injection mould.

However, these known devices have several disadvantages. One of these is the relatively costly heating elements and the difficulty of fitting them into the runner. Moreover, there are several points on the said heating elements to which the plastic material can and does cling. This introduces the danger of heat damage to the plastic material or, when a color is changed, equally disadvantageous contamination. In both cases, this means a large number of scrap mouldings and a corresponding drop in production. If this occurs over a period of time or to an excessive degree, the injection mould has to be removed and dismantled away from the machine for cleaning purposes.

Substantially the same disadvantages are associated with the use of an insulated runner. More particularly, a drop in temperature and pressure occurs in the vicinity of the insulated runner. In addition to this, the volume of the charge for the relevant injection-moulding machine must be large enough for the gage system and mould cavities to be filled with the initial charge. In these system, particular care must also be taken to ensure that a relatively thick layer solidifies on the inner wall of the insulated runner during the operation, as a result of which a thicker cross section than normal has to be provided to allow for the passage of the melt.

It is a broad object of the invention to eliminate the foregoing disadvantages while retaining all of the advantages of a runner with temperature control, and to produce an injection mould with which it is possible to obtain simultaneously optimal temperature control of the runners, easy and complete removal of the compound located in the runner (particularly when a color change is made), and rapid replacement of the temperature control means even when the mould is closed.

It is also an object of the invention to provide an effective temperature control device which does not impede the flow of plastic and is simple and cheap to build.

The foregoing objects are accomplished in that at least one temperature control device is attached interchangeably to the inner wall, or in recesses in the inner wall, of at least one runner of the apparatus, over its entire length or a part thereof. In another execution of this characteristic, provision is made for each temperature control device to have at least one closable opening to receive a temperature controlling medium. The opening into each said device is preferably accessible from the outside of the apparatus through one or more bores which may, with advantage, be arranged parallel with the axis of the runner. It is also provided in accordance with the invention that the part of the device projecting into the said runner be adapted, from the point of view of flow, to the hollow shape of the runner and, furthermore, that the two ends of the said device be streamlined or almost streamlined. A multipart design of the temperature control device, insulating devices between the mould halves and the respective device, attachment of the device by clamping means, and a detachable or non-detachable connection between different parts of the device are all preferred examples of execution of the invention.

One advantage of the invention is that a simple temperature control device is used which is easy to manufacture and therefore economical in use. The proposed said device also has the advantage of having no complex recesses, undercuts, or dead angles in which the plastic material may build up. Maintenance is thereby completely, or almost completely, eliminated, and neither is there any need to strip the mould or clean any individual parts while the machine is in use. When a color change takes place, removal of the compound in the runners presents no problem, since there are no heater cartridges or similar devices in the compound to be removed. Rheologically speaking, the advantages are noteworthy, since the part of the temperature control device projecting into the runner is adapted to the hollow shape thereof, and the two ends of the device are streamlined or almost streamlined (and are thus not devices arranged transversely to the flow of compound). Furthermore, the invention provides extremely simple fitting, the device being placed in position and being conveniently clamped by means of threaded screws. Replacement, therefore, also presents no problem, for example when a larger or smaller device is fitted. Finally, if a material is to be processed which requires no temperature control of individual runners, it is easy to close off, with a blind strip, the recess provided for the installation of the device.

The invention is explained hereinafter in greater detail, by way of example, with the aid of the embodiments illustrated in the accompanying drawings, wherein.

Figure 1:
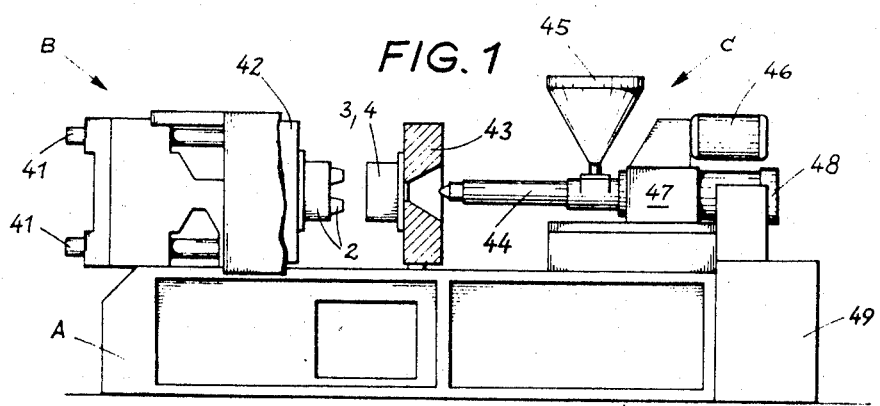
FIG. 1 is an injection moulding machine with open mould, in side elevation.

The injection-moulding machine shown in FIG. 1 has a machine bed A, a mould-closing unit B, and an injection unit C.

Figure 2:
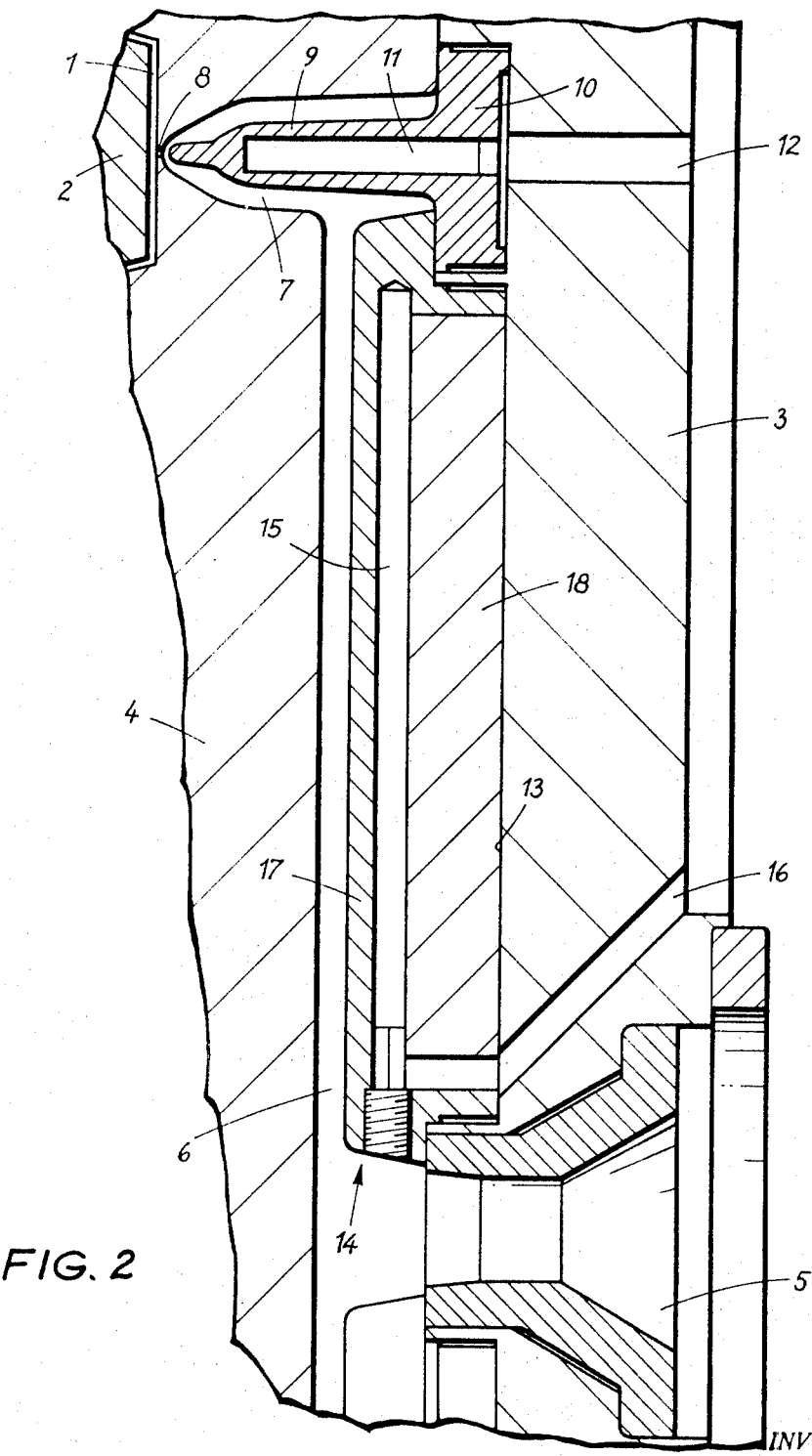
FIG. 2 is a section of the part of an injection mould showing a runner.
Figure 6:
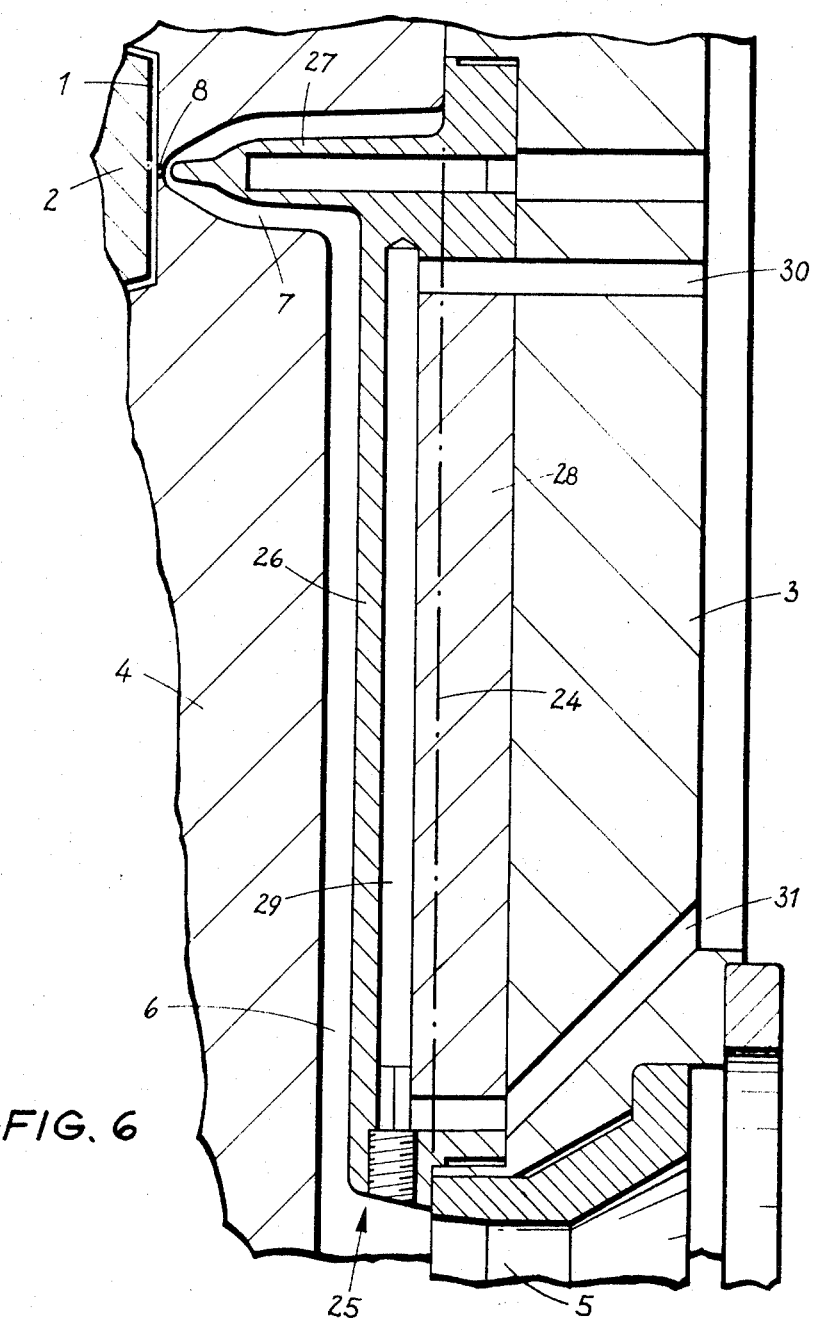
FIG. 6 is a section corresponding to FIG. 2 but with additional characteristics.

One mould-carrier plate 42 is mounted displaceably on the rails of mould-closing unit B. Attached to mould-carrier plate 42 is a mould-half, of which only the male part 2 which enters mould cavity 1 is shown in FIGS. 2 and 6. Attached to the stationary mould-carrier plate 43 on the nozzle side is the other mould-half consisting of parts 3 and 4. Parts 3 and 4 are connected rigidly together in the course of a moulding cycle.

Injection or mould-filling unit C of the injection moulding machine has a plasticizing cylinder 44 with a filling hopper 45. A worm arranged in plasticizing cylinder 44 is caused to rotate by means of an electric motor 46, through the transmission located in housing 47. The axial movement of the said worm within plasticizing cylinder 44 required for the injection operation is obtained by means of a hydraulic device 48, the machine being controlled by means of elements contained in cabinet 49.

At the start of an operating cycle, mould parts 2, 3 and 4 are in the position shown in FIG. 6, and the injection nozzle of unit C is placed against casting box 5. Axial pressure on the worm or on a piston in unit C, provided by hydraulic device 48, forces the compound from which the moulded parts are to be made out of the injection nozzle, through casting box 5, runner or runners 6, runner 7 at right angles thereto, and injection point 8, into respective mould cavity 1, which is completely filled. When the compound within cavity 1 has reached a specific strength by heating or cooling, the process of ejecting individual mouldings is initiated by moving mould-carrier plate 42, with the mould-halves attached thereto including male die 2, away from the other mould-half 3,4. As soon as the injection mould is fully open, as in FIG. 1, ejection devices are brought into action automatically in known fashion to eject the individual mouldings rapidly and reliably (if necessary with the aid of compressed air). As soon as the mould-halves are brought back into the position indicated, a new injection cycle may be started.

In order to prevent the compound from solidifying during the cycle, in the region of injection point 8, a temperature controlling pin 9 is arranged centrally in runner 7, base 10 of which rests in part 3 of the essentially stationary mould-half. For the accommodation of temperature controlling media, pin 9 has a bore 11 accessible through another bore 12 in part 3 of mould-half 3,4.

In order to maintain the flowability of the plastic material in runner 6, according to the invention, at least one temperature control device 14 is attached interchangeably to the inner wall, or in recesses 13 in the inner wall, of runner 6, over its entire length or a part thereof. As may clearly be seen in FIG. 2, for example, device 14 has at least one closable opening 15 for the accommodation of temperature controlling media. The said opening 15 is preferably arranged parallel with the axis of runner 6 and is also accessible from the outside through a bore 16, for example to accommodate the cable for a heater cartridge constituting said temperature controlling medium.

Figure 4:
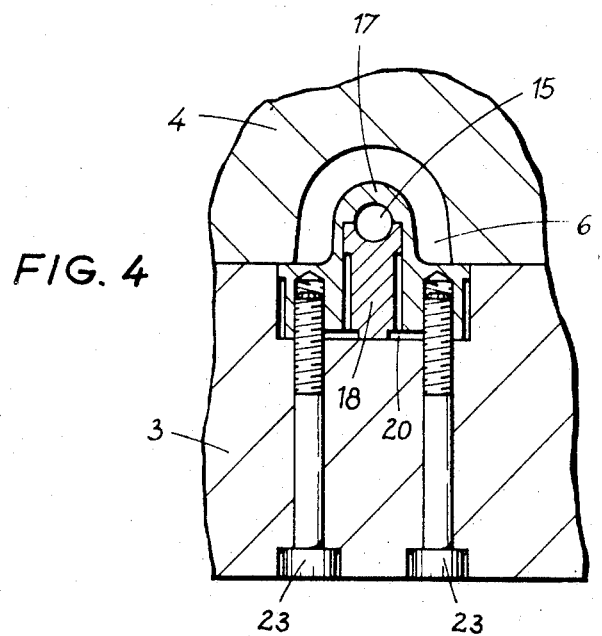
FIG. 4 is a section along the line III—III in FIG. 3.
Figure 3:
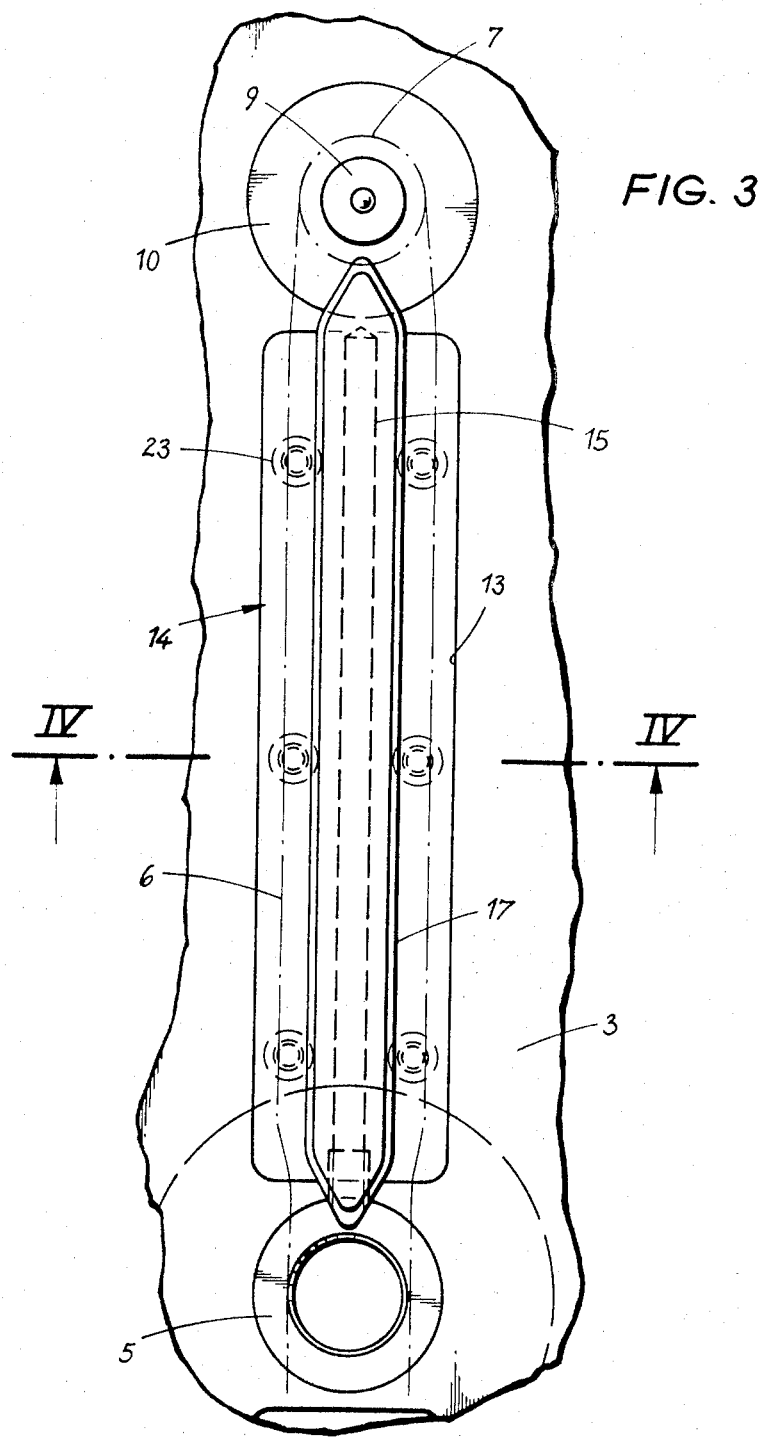
FIG. 3 is a plan view of the temperature control device with associated casting box.

As may be seen in FIGS. 3 and 4, the part of the device 14 which projects into the runner 6 is adapted for flow purposes to the hollow shape of the runner, in order that the compound may flow in an unimpeded and straight line. For the same reason, the two ends of device 14 are made streamlined or almost streamlined.

Figure 5:
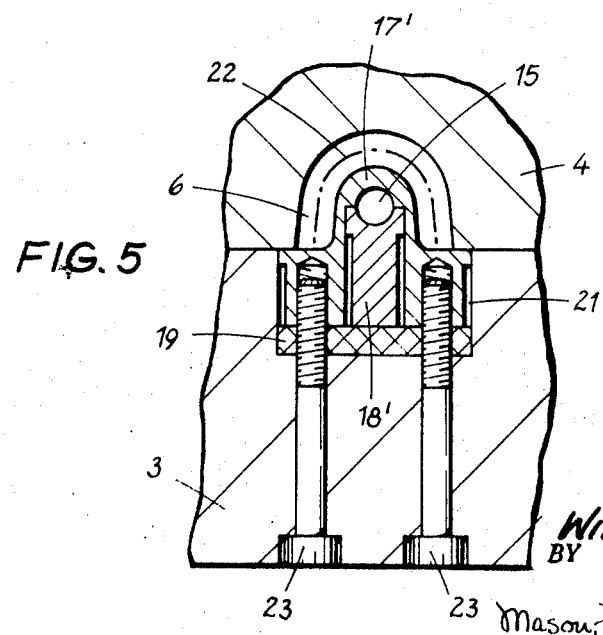
FIG. 5 is a section corresponding to that in FIG. 4, but of another embodiment of the invention.

As may be gathered from FIGS. 2, 3, 4 and 5, the device 14 may consist of several parts. The figures show a casing 17,17' defining the outer shape, and a core 18,18'. FIGS. 3, 4 and 5 show quite clearly that a passageway 15 is enclosed by casing 17,17' and core 18,18'. Finally it is desirable to provide, between mould-half 3,4 and the device 14,17,17', 18,18' attached thereto, one or more heat barriers in the form of insulator elements 19 and/or insulating air gaps 20, 21.

It has already been indicated that the device 14,17,17', 18,18' is detachably located in the runner 6, in order to make it possible to use temperature control devices of different sizes (indicated in FIG. 5 by dotted line 22). To this end clamping means are provided, preferably threaded screws 23, engaging in corresponding threaded holes in casing 17,17'. If during the processing of some special material, it becomes necessary to remove the device from the runner, it is a simple matter to close off recess 13 with a blind strip (as shown by dotted line 24 in FIG. 6).

The temperature controlling pin 9, constituting a part of the device 14, may form a single unit together therewith (FIG. 6). In this example of execution, casing 26 and pin 27 are in one piece, in contrast to the detachable connection shown in FIG. 2 between pin 9,10 and casing 17,17'. Here again, casing 26 and core 28 enclose passageway 29 which itself extends almost to the pin 27. In order that a heating or cooling medium may circulate through the passageway 29, bores 30 and 31 are provided, the two ends of the passageway 29 being thus accessible from the outside.

What we claim as new and desire to protect by Letters Patent of the United States is:

1. In a multipart injection molding machine having injection means and a mold cavity, a runner plate assembly with at least one runner for distributing molding material in plastic state from said injection means to said mold cavity, at least one elongated temperature control device detachably secured within said runner at and along an interior wall of the runner by being detachably mounted within a recess formed in an interior side wall of said runner and extending over at least part of the length of the runner with said elongated temperature control device being proportional and dimensioned relative to said recess to provide an air gap between an outer portion of the side walls of the recess and said elongated temperature control device.

2. Mold apparatus as claimed in claim 1 wherein said passageway is of elongated form extending substantially parallel with the direction of said runner with which said elongated temperature control device is installed, and said elongated temperature control device is formed with a substantially streamlined exterior configuration for facilitating flow of said plastic material thereover during its passage through said runner.

3. The invention of claim 1 additionally including an insulating strip interposed between said elongated temperature control device and the base of said recess.

4. Mould apparatus as claimed in claim 1, wherein said elongated temperature control device comprises a casing and a core providing a hollow passageway for accommodating a temperature controlling medium therein, said passageway being formed with a closeable opening accessible from the exterior of the apparatus for facilitating introduction of said medium to said passageway.

* * * * *